Sept. 15, 1953        E. C. ROEPKE        2,651,901
BEET HARVESTER
Filed Dec. 4, 1950        2 Sheets-Sheet 2
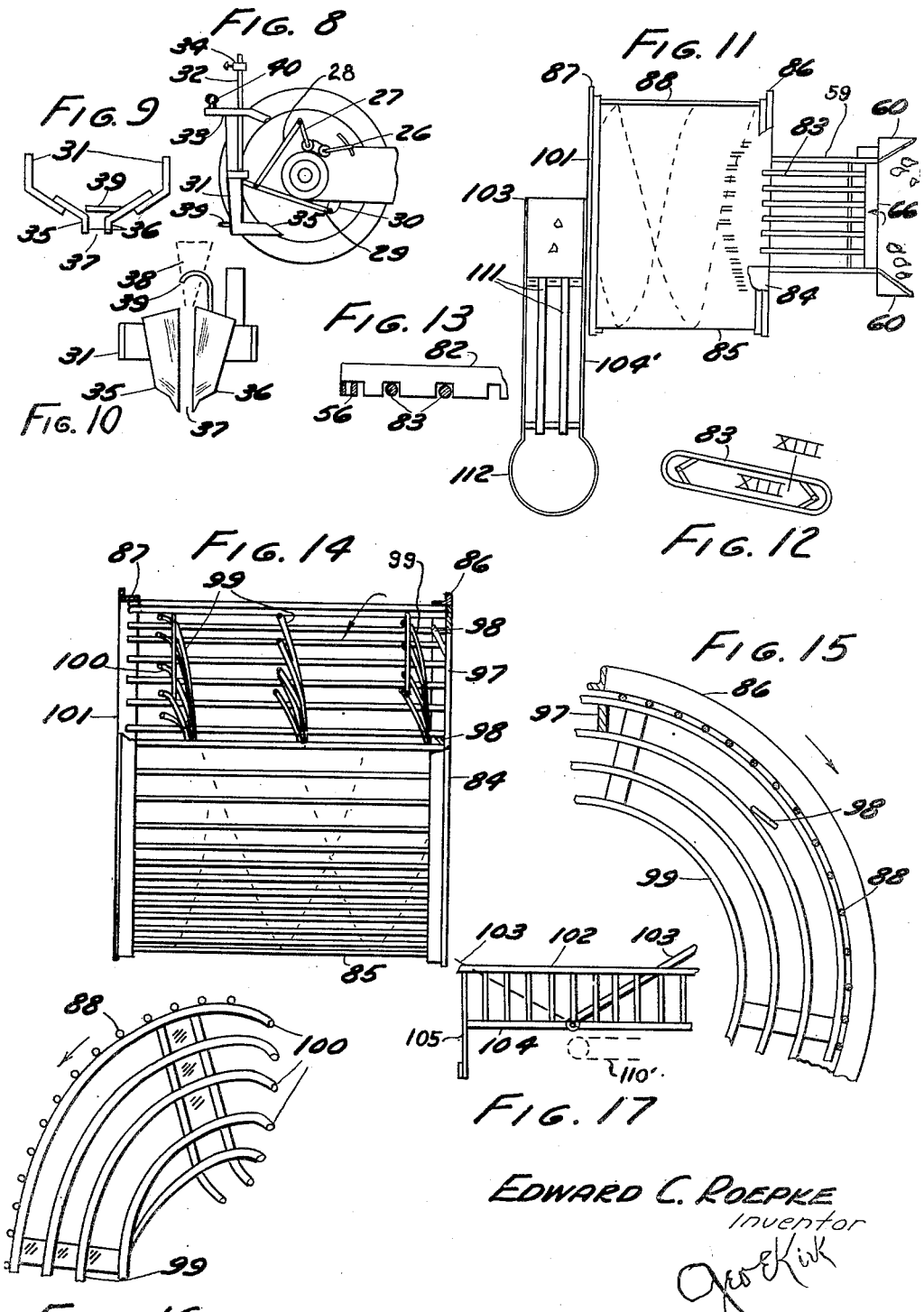

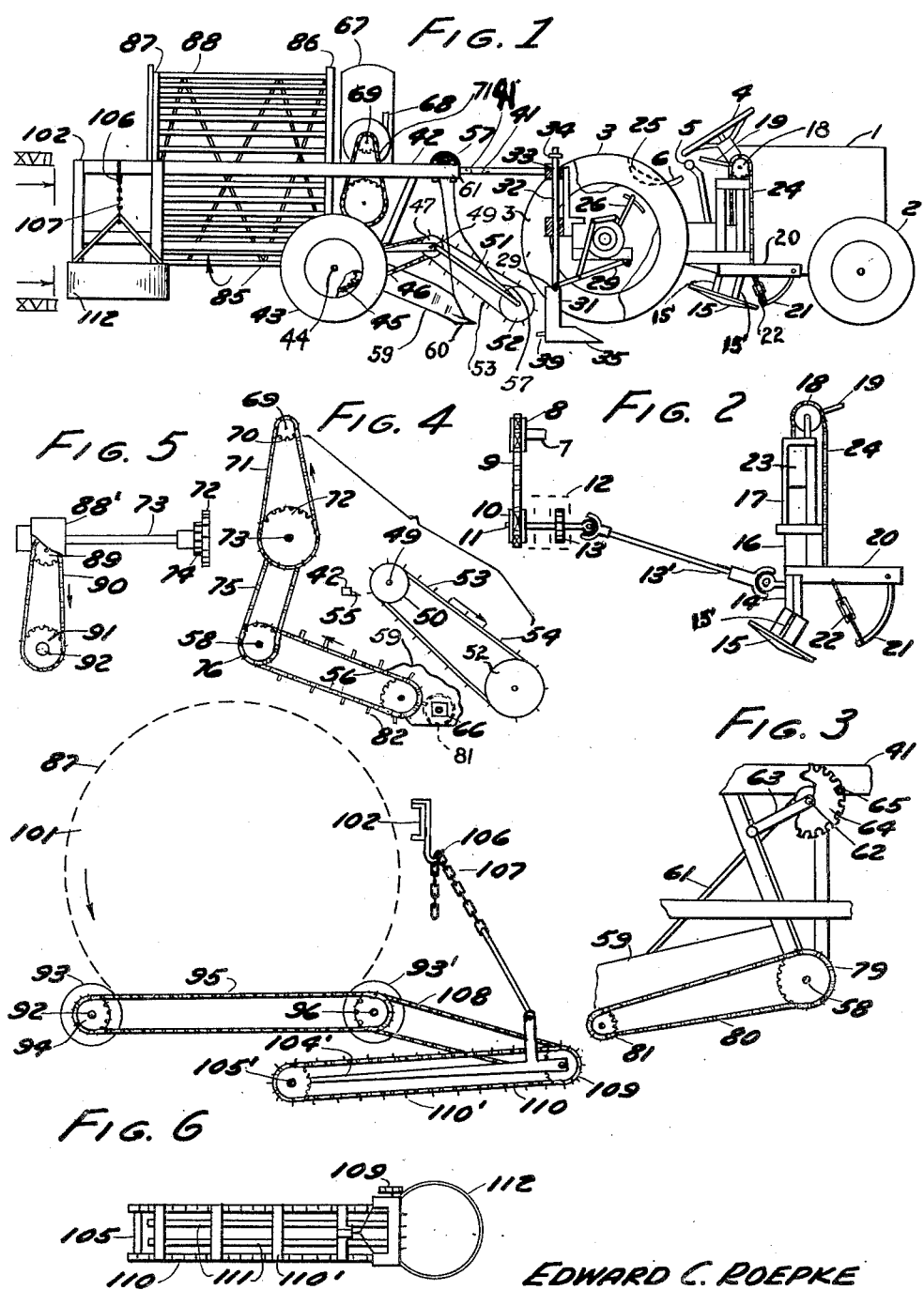

Patented Sept. 15, 1953

2,651,901

UNITED STATES PATENT OFFICE 2,651,901

BEET HARVESTER

Edward C. Roepke, Elmore, Ohio

Application December 4, 1950, Serial No. 199,083

6 Claims. (Cl. 55—9)

This invention relates to agricultural equipment for the root crop type of produce.

This invention has utility when incorporated in a harvester, say for sugar beets, and in the embodiment herein disclosed there is facility for topping, lifting and depositing in windrows, in the operation afield.

Referring to the drawings:

Fig. 1 is a side elevation with parts broken away of a diagrammatic tractor equipped with beet topper mechanism, beet lifting devices, and a trailer with kick-up from the lifting devices, with general cleaning conveyor means for clustering the cleaned beets in windrows;

Fig. 2 is a fragmentary side elevation showing the topper in lowered, or active position, with transmission to its cutting disk from the power take-off of the tractor;

Fig. 3 is a partial view from the side opposite that of Fig. 1, showing the lift adjustment for the conveyor which delivers to the cleaner cage, there being showing of the speed-up transmission to drive the kicker bar which operates in advance of the conveyor;

Fig. 4 is a transmission detail from the motor shaft to the conveyor, which conveyor has in advance thereof the kicker bar as also a beet-piercing pick-up to discharge on the conveyor;

Fig. 5 shows a portion of the drive for the cage or rotary screen conveyor section;

Fig. 6 is a detail view of the adjustable free end or final conveyor to which the screen conveyor may deliver, with the driving connections carrying thru therefor;

Fig. 7 is a plan view of the final conveyor from the trailer cleaner to the window;

Fig. 8 shows a detail of the lifter in out-of-use position, as distinguished from the in-use position showing in Fig. 1;

Fig. 9 is a front elevation of the lifter of Fig. 8;

Fig. 10 is a plan view of the lifter of Fig. 9;

Fig. 11 is a plan view, with a portion broken away, of the cage conveyor element, the feeder conveyor way thereto and the discharge conveyor way therefrom, the flight conveyors on these two latter ways being omitted;

Fig. 12 is a detail in side elevation of the feeder conveyor way as to the flight directing parallel bars;

Fig. 13 is a partial section, on an enlarged scale on the line XIII—XIII, Fig. 12, showing a flight portion riding on the bars;

Fig. 14 is a side view of the rotary cage or cleaner screen conveyor element, a portion thereof being broken away;

Fig. 15 is a detail portion, on an enlarged scale of section of the intake end of the cage, looking from inside of the cage outward;

Fig. 16 is a view of a cage section, looking into the cage from its discharge end, and showing scroll conveyor kick-out features for tumbling beets, as cleaned, therefrom; and Fig. 17 is an elevation of the deflector apron onto which the beets from the cage roll for direct deposit in a window following the trailer, or to be side-delivered by the final conveyor, the view being from the line XVII—XVII, Fig. 1.

A tractor 1 has forward ground wheels 2 and rear ground wheels 3, a steering wheel 4 and a gear shift handle 5. A handle 6 provides a control for a power take-off shaft 7. The tractor is normally a self-propelled vehicle and thus is a structure providing an actuation source for the shaft 7 for rotation thereof.

The topper

The take-off shaft 7 (Fig. 2) has at its rear end a sprocket wheel 8 from which a sprocket chain 9 extends downward to a sprocket wheel 10 on a shaft 11 into a gear box 12. In this two-row handling apparatus, there is a pair of toppers, and in the gear box 12 below the axle region for the wheels 3 there is gearing connection at the box 12 (Fig. 2) each way to a pinion 13, from which there is telescopic flexible connection 13' to a box 14 from which there is depending at a slight pitch a concave rotary disk 15 as the active element of the topper, with vanes 15' for self cleaning. The box 14 has an upward extension 16 slidable in a guide 17, with a topper 15 along a side of the tractor between a front wheel 2 and a rear wheel 3. Mounted on the top of the guide 17 is a sprocket wheel 18 operable by a crank handle 19. Besides the upward extension 16, the box 14 has a forward extension or arm 20. From the forward free end of the arm 20 there hangs pivotally a rearwardly arced shield 21 having a forwardly convex face. A turnbuckle 22 adjusts the downswing or fending position for the shield 21 in advance of the topper 15. A counterweight 23 is in the guide 17 and has a sprocket chain 24 therefrom passing about the sprocket wheel 18 to the arm 20. As the operator of the tractor swings the handle 19 forwardly, the counterweight 23 is lifted and the box 14 is lowered for the topper disk 15 to be in beet top removing position. To clear the topper disk 15 from active position, the handle 19 is swung upward and aft, for lowering the counterweight 23 and raising the box 14 and its connected parts.

The lifter

In proximity to a seat 25 on the tractor, and thereby convenient to the driver of the tractor, is a hand lever 26 (Figs. 1, 8). This lever as shifted coacts to rock an arm 27 and thru a link 28 shift a lever 29. The lever 29 has its forward end 30 pivoted to the tractor, desirably slightly forward of the region for the axle for the wheels 3. The after end of the lever 29 has a pivotal connection 29' to a member 31 from which extend upwardly slide rods 32 in frame guide means 33 fixed with the tractor frame or chassis. On the rods 32, one for each lifter as trailing the topper therefor, there is a set-screw adjusted ring or collar 34, which in rod 32 descent serves as a stop. There is thus regulated the depth position for lifter plowshares 35, 36, having spacing 37 (Figs. 8, 9) therebetween. A topped beet 38, in its upward lifting during riding between the plowshares 35, 36, passes clear thereof. However, as thus lifted to have its lesser diameter portion downward, there is fixed with one of the plowshares 35, or 36, of the lifter, a hook 39. The hook 39 pulls the lesser diameter beet root along, so that the larger diameter beet top falls back away from the lifter. The lever 26 (Fig. 1) is positioned for the lifter to be down in soil cutting position to ride under beets as in a row in the ground over which the tractor 1 is traveling. With the tractor traveling away from harvesting, the lever 26 may be shifted to its other position (Fig. 8) for the lifter to be elevated clear of the ground. It is to be noted that in the down, or operative position, the points of the plowshares 35, 36, approximate directly below the axle region for the wheels 3. There is thus insured a positive location for the lifter pair. Accordingly, with the wheels 3 having a row space therebetween, the wheels 3 as maintained in such row spaces, makes it thereby easy for the driver to know that the two rows as thus passing under the tractor are in register with the lifters, in greater accuracy than for the toppers, as to which latter there may be greater range and not hurtfully affect harvesting operations.

*The pick-up*

The frame guide means 33, fixed with the tractor chassis, has a trailer hitch knuckle 40 (Fig. 8) adapted to be engaged by a complementary cap member forward end of a tongue 41 (Fig. 1) having a connection 41' in its forward extent from a frame 42 of a trailer having ground wheels 43, on axle 44. Fixed with the axle 44 is a sprocket wheel 45 from which extends forwardly a sprocket chain 46 to a sprocket wheel 47 on a shaft 49. This shaft 49 is mounted in a forwardly extending arm portion of the frame 42. On the shaft 49 is a pulley 50, which at the gearing rate is peripherally to have speed approximately that of the periphery of the ground wheels 43. Forwardly downwardly swingable from the shaft 49 is a frame 51 which at its lower free end carries in alignment with the plane of the respective pulleys 50, 52. Over the pulleys 50, 52, is a rubber belt 53, say in the range of eight inches wide, to span beet row width as trailing the lifters. The belt 53 may have therealong, a plurality of rows of points or spikes 54, at a spacing of two inches. Thus, in tractor progress, at the travel rate thereof, the belt 53 flexes its spikes 54 to enter the beets as lifted and reposing on the loose soil. In this travel course as the belt moves over the beet as at repose, the upwardly directed after reach of the belt 53 carries upward therewith the respective impinged beets. A fixed rake 55 mounted on the frame 42 and projecting with tines toward the belt 53, pushes the impinged beets to fall clear of the pick-up upon a conveyor belt 56 of the feeder for the cleaner (Fig. 4).

This pick-up is of special value as the soil may be muddy, or of beet clinging characteristic. The soil as pierced by the spikes 54, crumbles away, and there is here an automatic phase of cleaning operation. Furthermore, the beet as lifted, is minus much, if not all, of the soil. Where there be not occasion for this pick-up of beet piercing type, a cable 57 may swing the frame 51 upward to inoperative position, where is it located in trips to and from a field for use.

*The kicker*

On the frame 41 mounted at a shaft 58 (Fig. 3) is a way 59 for the feeder conveyor belt 56. The forward end of the way 59, as down, rides on shoes 60 (Fig. 11). To lift the way 59 clear of the ground for travel not afield, as well as to adjust a down position for operation afield, there is a cable 61 (Fig. 3) about a shaft 62 having a crank 63. A notched disk 64 fixed with the shaft 62 may have a pin 65 in a notch and with the pin thus set in the frame 41, the adjusted inclination for the way 59 is set. In the region of the shoes 60, there is a polygonal or square kicker or bar 66.

Mounted on the frame 42 is a prime mover or gas engine 67 (Fig. 1) having a control lever 68 with transmission to a shaft 69 on which is a sprocket wheel 70 with a chain 71 downwardly therefrom to a sprocket wheel 72 (Figs. 4, 5) on a shaft 73 extending across and mounted in a forward portion of the way 59 (Fig. 11). A sprocket wheel 74 fixed with the wheel 72 has a chain 75 therefrom to drive the conveyor belt 56 in the way 59. The chain 75 is to a sprocket wheel 76 fixed on the shaft 58. Fixed on the shaft 58 remote from the wheel 76 is a larger sprocket wheel 79 (Fig. 3) from which extends a chain 80 to a wheel 81 fixed with the bar 66. The higher rotative speed for the bar 66 than the travel rate established for the conveyor 56, as well as in excess of the travel rate over the ground, gives the kicker bar 66 up swing of its forward edge, at such a rate as to throw uprooted loose beets, as may lie ahead, up on the belt 56 to be pulled along by flights 82. This is the operation in the event there be beets laterally out of the range of the pick-up, or the pick-up be not used. Whether or not there be the pick-up, the kicker-bar 66 acts on the soil as loose. When the pick-up has been functioning, the bar 66, as carried by the way 59 and thus adjusted up and down by the cable 61, may ride close to the surface, or just above, to act to cause the lifter course of the plowshare 35 to be less conspicuous.

*The feeder conveyor*

The way 59 has endless parallel bars 83 (Figs. 11, 12, 13) along which ride the flights 82. The spacing between the bars 83 is for free falling of debris or loose dirt from the beets as pushed along by the flights 82. By locating the flights 82 astride the bars 83 in both the ascent or active reach as well as the idle or under reach, there is efficient self-cleaning, especially as to foliage, weeds, vines and the like, as the equipment is pulled ahead by the tractor 1, notwithstanding the sifting thru of the elevated beets into a discharge open end clearance 84 in a screen cage or conveyor 85.

*The tumbler*

Between end angle hoops or rings 86, 87 (Figs. 1, 14), extend parallel bars or rods 88 forming a cage or screen. The shaft 73 (Fig. 5) remote from the wheel 72 has a gear box 88', providing a drive connection to a sprocket wheel 89 from which there extends downwardly a sprocket chain 90 to a sprocket wheel 91 on a shaft 92 having supporting rollers 93, one for each track or ring 86, 87. The after end of the shaft 92 carries a sprocket wheel 94 (Fig. 6) with a chain 95 therefrom to drive a shaft 96 parallel to the shaft 92, having additional cage supporting rollers 93' thereon. There is thus provided a live cradle for the cage to be rotated.

There is forwardly directed an open end 84 (Fig. 14) which end has an inwardly extending flange 97 with inwardly directed deflecting fingers 98, say one for each quadrant, to urge beets falling into the cage from the conveyor 56 to shift away from the open end 84 and in their lifting action from the cage rotation follow a tumbling course from the two pitch multiple bar helical conveyor means 99 (Figs. 14, 15, 16) to kick-out fingers 100 at cage discharge end 101. There is resultant efficient cleaning of loose soil from the beets. The beets are tumbled by the helices or scrolls 99. This rolling and tumbling is to fall, roll and ride over the bars 88. Without severe bruising of the beets there is rolling and pitching thereof to clean them.

*Windrow delivery*

To leave a full clearway for the cage 85 outlet 101, the frame 42 has a rearward extension 102 (Figs. 1, 11, 17) in which is mounted an apron or vane 103, swingable toward the shaft 96 to deflect beets tumbling from the cage 85 opening 101 to be deposited in a windrow following the equipment. Guard bars 104 preclude too great rearward spill from the cage 85, while guard 105 holds the windrow width to be close to the apron 103.

Alternative to the trailer delivery, there may be side windrow delivery, which means that in successive trips across a field, one windrow laying may be upon another, thereby increasing the beet volume to be loaded in a single transit across the field. A way 104'' is mounted on a shaft 105' (Fig 6). A hook 106 engages a chain 107, which chain may pull up or lower the free end of the way 104', as may be proper. From the shaft 96 there is a sprocket chain 108 to a sprocket wheel 109 at the free end of the way 104' to drive a conveyor 110 upper reach outward from its flights 110' (Figs. 7, 17) to ride on slats 111 with discharge spill into a ring like shield 112. The shaft 105' is at the guard 105 and there mounted. There is thus restriction of the throw-off of beets from the discharge conveyor 110. The shield 112 confines the fall of the cleaned beets to a definite range in the lateral windrow.

As suggested, there may be idle adjustment for different sections of the sequence of harvesting effecting mechanisms as herein disclosed for one-man handling as driving the tractor 1. However, it is to be noted that there is cooperative interrelation efficiency. The topper is mounted somewhat forward of the main control ground wheels 3 of the tractor, but within the tolerance for effective operation. The less tolerance required for best lifting is in the axle region of the wheels 3. The trailer hitch connection 40, 41, desirably approaches the center of gravity pull, against disturbing tractor or cleaner handling. The beet orienting (Fig. 10) is in register for transfer into the cleaner and from the cage 85 to a selected windrow.

What is claimed and it is desired to secure by Letters Patent is:

1. A root crop harvester comprising: a frame guide means for attachment to the rear of a tractor, a lifter for the roots having a vertically extending portion vertically adjustable in said guide means, a mobile trailer pivotally attached to said frame guide means at a point vertically above said lifter, and a pick-up mechanism for the lifted roots mounted on said trailer, said pick-up mechanism including a conveyor which extends downwardly and forwardly from said trailer to a point adjacent the rear portion of said lifter whereby the forward end of said conveyor always trails said rear portion of said lifter regardless of the angular position between the tractor and said trailer.

2. A harvester according to claim 1 wherein said lifter includes a hook attached to said rear portion for aligning the roots before being picked up by the pick-up mechanism.

3. A harvester according to claim 1 wherein said pick-up mechanism includes means mounted on said trailer for vertically adjusting the end of said conveyor adjacent said rear portion of said lifter.

4. A harvester according to claim 1 wherein said conveyor is a belt provided with tines to pierce the roots on the ground dug up by said lifter.

5. A root crop harvester comprising: a frame guide means for attachment to the rear of a tractor, a lifter for the roots having a rear portion and a plow share front portion, said lifter having a vertically extending portion vertically adjustable in said guide means, a movable trailer pivotally attached to said frame guide means at a point vertically above said lifter, said trailer having ground wheels and a power supply, and a pick-up mechanism for the lifted roots mounted on said trailer, said pick-up mechanism including: a conveyor which extends downwardly and forwardly from said trailer to a point adjacent said rear portion of said lifter whereby the forward end of said conveyor always trails said rear portion of said lifter regardless of the angular position between the tractor and said trailer, a power connection from said power supply to move said conveyor, and a rotating kicker device mounted on said trailer, said kicker being operated by said power supply to kick up the roots missed by said conveyor.

6. A harvester according to claim 5 wherein said pick-up mechanism also includes a second conveyor trailing said kicker and operated by said power supply on said trailer to collect the roots missed by the first mentioned conveyor and kicked up by said kicker.

EDWARD C. ROEPKE.

References Cited in the file of this patent
UNITED STATES PATENTS

| Number | Name | Date |
|---|---|---|
| 1,149,411 | Slawson | Aug. 10, 1915 |
| 1,282,657 | Tussing | Oct. 22, 1918 |
| 1,545,331 | Kaapke et al. | July 7, 1925 |
| 2,007,161 | Gailus | July 9, 1935 |
| 2,296,851 | Henry | Sept. 29, 1942 |
| 2,337,307 | Beck | Dec. 21, 1943 |
| 2,337,698 | Walz | Dec. 28, 1943 |
| 2,369,850 | Powers | Feb. 20, 1945 |
| 2,405,205 | Gordon et al. | Aug. 6, 1946 |
| 2,538,131 | Smith | Jan. 16, 1951 |
| 2,539,881 | Wilkins | Jan. 30, 1951 |

FOREIGN PATENTS

| Number | Country | Date |
|---|---|---|
| 609,254 | Great Britain | Sept. 28, 1948 |